US009485702B1

(12) United States Patent
Chindapol et al.

(10) Patent No.: US 9,485,702 B1
(45) Date of Patent: Nov. 1, 2016

(54) WIRELESS DEVICE COMMUNICATION USING CARRIER PRIORITY

(71) Applicant: Sprint Spectrum LP, Overland Park, KS (US)

(72) Inventors: Aik Chindapol, Washington, DC (US); Chunmei Liu, Great Falls, VA (US); Muhammad Naim, Sterling, VA (US); Yu Zhou, Herndon, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 272 days.

(21) Appl. No.: 13/875,131

(22) Filed: May 1, 2013

(51) Int. Cl.
*H04W 36/30* (2009.01)

(52) U.S. Cl.
CPC .................... *H04W 36/30* (2013.01)

(58) Field of Classification Search
CPC ... H04W 36/22; H04W 24/02; H04W 36/30; H04W 28/08; H04W 88/06; H04W 52/40; H04W 36/14; H04W 16/14; H04W 36/08; H04W 36/0083; H04W 84/045; H04W 36/04; H04W 52/343; H04W 36/06; H04W 52/241
See application file for complete search history.

(56) References Cited

U.S. PATENT DOCUMENTS

| 6,021,328 | A   | *  | 2/2000  | Curtis ................... H04W 36/30 455/436 |
| 6,941,141 | B2  | *  | 9/2005  | Park ..................... H04W 36/26 370/331 |
| 7,197,310 | B2  | *  | 3/2007  | Gehlot .................. H04W 36/32 370/331 |
| 7,573,857 | B1  | *  | 8/2009  | Radhakrishnan ..... H04W 48/20 370/336 |
| 7,805,142 | B2  | *  | 9/2010  | Calin .................... H04W 36/22 370/331 |
| 2012/0014332 | A1 |   | 1/2012  | Smith et al. |
| 2013/0337778 | A1 | * | 12/2013 | Ye ..................... H04W 36/0083 455/411 |
| 2014/0098670 | A1 | * | 4/2014  | Choi ........................ H04L 5/00 370/235 |
| 2014/0153546 | A1 | * | 6/2014  | Kim ...................... H04W 48/18 370/332 |
| 2014/0349647 | A1 | * | 11/2014 | Chen ..................... H04W 36/30 455/436 |

FOREIGN PATENT DOCUMENTS

EP       2073579 A1 *  6/2009

* cited by examiner

*Primary Examiner* — Anthony Addy
*Assistant Examiner* — Martin Chang

(57) ABSTRACT

In systems and methods of wireless device communication using carrier priority, it is determined for a wireless device using a lower priority carrier that a signal strength of a higher priority carrier meets a signal strength criteria. It is further determined that a loading of the higher priority carrier meets a loading criteria. When the loading meets the loading criteria and the signal strength meets the signal strength criteria, a handover is performed of the wireless device from the lower priority carrier to the higher priority carrier.

12 Claims, 7 Drawing Sheets

WIRELESS DEVICE COMMUNICATION USING CARRIER PRIORITY

TECHNICAL BACKGROUND

Wireless communication system operators typically deploy two or more carrier bands or frequency spectrums at an access node to support communications with wireless devices. The multiple carrier bands may be under the control of a single system operator, or agreements may exist among two or more operators to share network resources, including carrier bands. Communication system operators may desire to control when certain carrier bands are shared and when others are not.

OVERVIEW

In operation, when a wireless device operates on a first carrier, it is determined for the wireless device that a signal strength of a second carrier, which is associated with a higher priority than the first carrier, meets a signal strength criteria. It is further determined that a loading of the higher priority second carrier meets a loading criteria. When the loading meets the loading criteria and the signal strength meets the signal strength criteria, a handover is performed of the wireless device from the lower priority carrier to the higher priority carrier.

DETAILED DESCRIPTION

Figure 1:
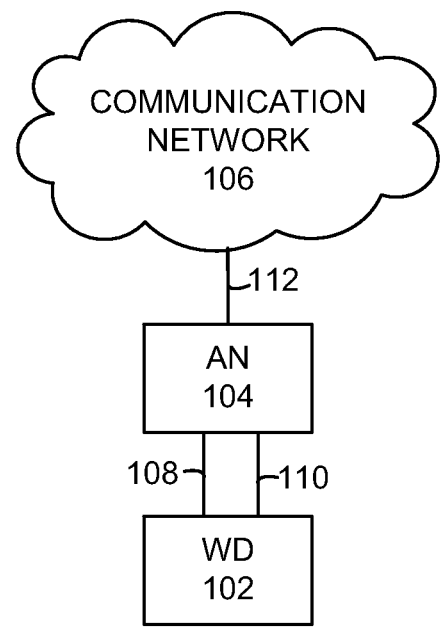
FIG. 1 illustrates an exemplary communication system for wireless device communication using carrier priority.
Figure 1:
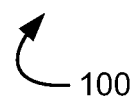

FIG. 1 illustrates an exemplary communication system 100 for wireless communication using carrier priority comprising wireless device 102, access node 104, and communication network 106. Examples of wireless device 102 can include a cell phone, a smart phone, a computing platform such as a laptop, palmtop, or tablet, a personal digital assistant, or an internet access device, including combinations thereof. Wireless device 102 can communicate with access node 104 over communication links 108 and 110. Each of communication links 108 and 110 can comprise a carrier, such as a carrier band or frequency spectrum.

Access node 104 is a network node capable of providing wireless communications to wireless device 102, and can be, for example, a base transceiver station, a radio base station, an eNodeB device, or an enhanced eNodeB device. Access node 104 is in communication with communication network 106 over communication link 112.

Communication network 106 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 106 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 106 may also include base stations, wireless communication nodes, telephony switches, internet routers, network gateways, computer systems, communication links, or some other type of communication equipment, and combinations thereof.

Communication links 108, 110 and 112 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in the communication system 100 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 104 and communication network 106 which are omitted for clarity, including additional processing nodes, routers, gateways, and physical and/or wireless data links for carrying data among the various network elements.

In operation, it is determined for wireless device 102 using lower priority carrier 108 that a signal strength of higher priority carrier 110 meets a signal strength criteria. It is further determined that a loading of higher priority 110 carrier meets a loading criteria. When the loading meets the loading criteria and the signal strength meets the signal strength criteria, a handover is performed of wireless device 102 from lower priority carrier 108 to higher priority carrier 110. In an embodiment, the lower priority carrier is operated by a first network operator, and the higher priority carrier is operated by a second network operator.

Figure 2:
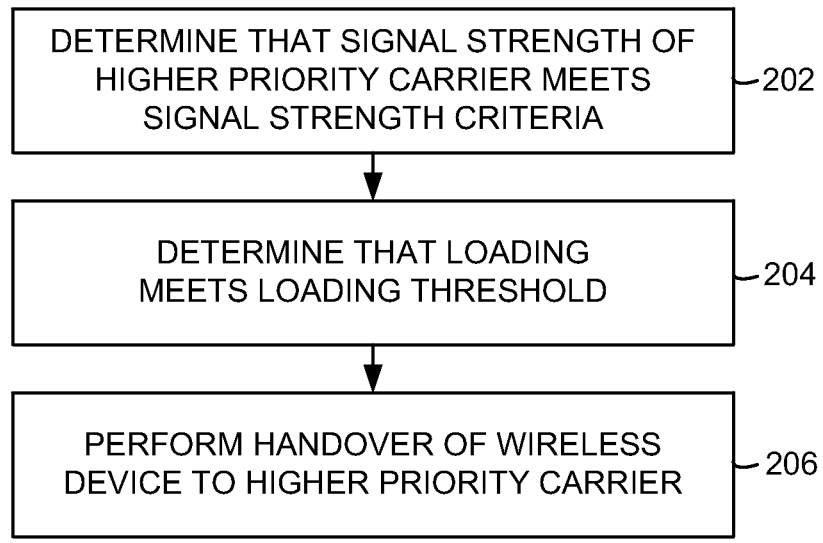
FIG. 2 illustrates an exemplary method of wireless device communication using carrier priority.

FIG. 2 illustrates an exemplary method of wireless device communication using carrier priority. In operation 202, it is determined for a wireless device using a lower priority carrier that a signal strength of a higher priority carrier meets a signal strength criteria. For example, wireless device 102 can be in communication with access node 104 over communication link 108. Communication link 108 can correspond to a first carrier associated with a lower priority, and communication link 110 can correspond to a second carrier associated with a higher priority than the first carrier. It can be determined for wireless device 102 that a signal strength of the second carrier meets a signal strength criteria. For example, wireless device 102 can provide to access node 104 a signal strength indicator of a signal strength of the first carrier and the second carrier. Examples of a signal strength indicator include a reference signal received power (RSRP), reference signal received quality (RSRQ), received signal strength indicator (RSSI), a signal to interference plus noise ratio (SINR), a carrier to interference plus noise ratio (CINR), and the like. The signal strength indicators can indicate that the second carrier has a sufficient signal strength, as reported by wireless device 102, to support a communication activity of wireless device 102. For example, the signal strength of the second carrier can satisfy an application requirement of an application running on wireless device 102. For example, the signal strength of the second carrier can satisfy a minimum data rate, a maximum data delay, or a maximum error rate of an application running on wireless device 102. Other signal strength criteria are also possible.

In operation 204, it is determined that a loading of the higher priority carrier meets a loading criteria. For example, it can be determined that the second carrier (associated with communication link 110) has sufficient resources to support wireless device 102. In an embodiment, the second carrier may have sufficient capacity to support a communication activity of wireless device 102. In an embodiment, a number of other wireless devices operating on the second carrier can be determined, and it can further be determined that adding wireless device 102 to the second carrier would not overload the second carrier. Other loading criteria are also possible.

In operation 206, when the loading meets the loading criteria and the signal strength meets the signal strength criteria, a handover is performed of the wireless device from the lower priority carrier to the higher priority carrier. For example, wireless device 102 can be handed over from first carrier 108 to second carrier 110 when the loading meets the loading criteria and the signal strength meets the signal strength criteria.

Figure 3:
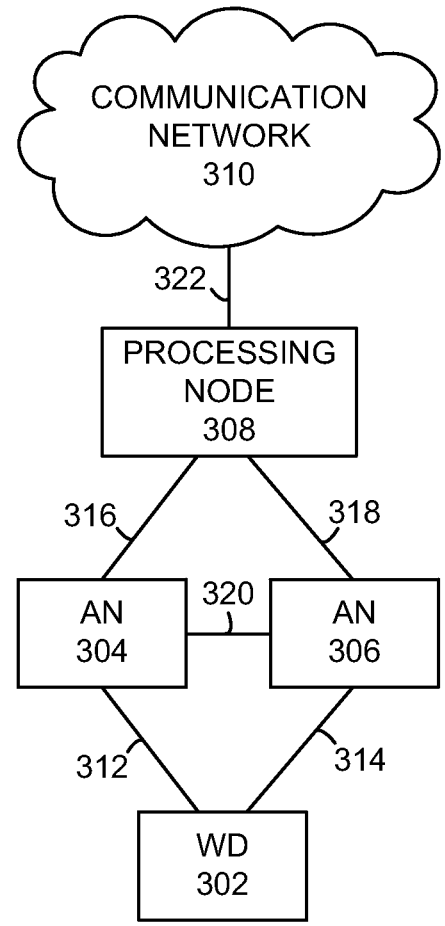
FIG. 3 illustrates another exemplary communication system for wireless device communication using carrier priority.

FIG. 3 illustrates another exemplary communication system for wireless device communication using carrier priority comprising wireless device 302, access nodes 304 and 306, processing node 308, and communication network 310. Examples of wireless device 302 can include a cell phone, a smart phone, a computing platform such as a laptop, palmtop, or tablet, a personal digital assistant, or an internet access device, including combinations thereof. Wireless device 302 can communicate with access node 304 over communication link 312 and with access node 306 over communication link 314. Each of communication links 312 and 314 can comprise a carrier, such as a carrier band or frequency spectrum, such that communication link 312 corresponds with a first carrier and communication link 314 corresponds with a second carrier. While a single wireless device 302 is illustrated in FIG. 3, it will be appreciated that in operation a plurality of wireless devices can be in communication with both access node 304 and access node 306.

Access nodes 304 and 306 are each a network node capable of providing wireless communications to wireless device 302, and can be, for example, a base transceiver station, a radio base station, an eNodeB device, or an enhanced eNodeB device. Access node 304 is in communication with processing node 308 over communication link 316, and access node 306 is in communication processing node 308 over communication link 318. Access nodes 304 and 306 can also communicate with each other over communication link 320. In an embodiment, access node 304 can be under the control of a first network operator, and access node 306 can be under the control of a second network operator.

Processing node 308 is a network element which can comprise a processor and associated circuitry to execute or direct the execution of computer-readable instructions. Processing node 308 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Processing node 308 can, among other things, direct wireless device communication using carrier priority. Processing node 308 can be for example, a standalone computing device or network element, or the functionality of processing node 308 can be included in another network element. The functionality of processing node 308 can also be incorporated into, or may be distributed across, two or more network elements. Processing node 308 is in communication with communication network 310 over communication link 322.

Communication network 310 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 310 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 310 may also include base stations, wireless communication nodes, telephony switches, internet routers, network gateways, computer systems, communication links, or some other type of communication equipment, and combinations thereof.

Communication links 312, 314, 316, 318, 320 and 322 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 300 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 304, access node 306, processing node 308 and communication network 310 which are omitted for clarity, including additional processing nodes, routers, gateways, and physical and/or wireless data links for carrying data among the various network elements.

Figure 4:
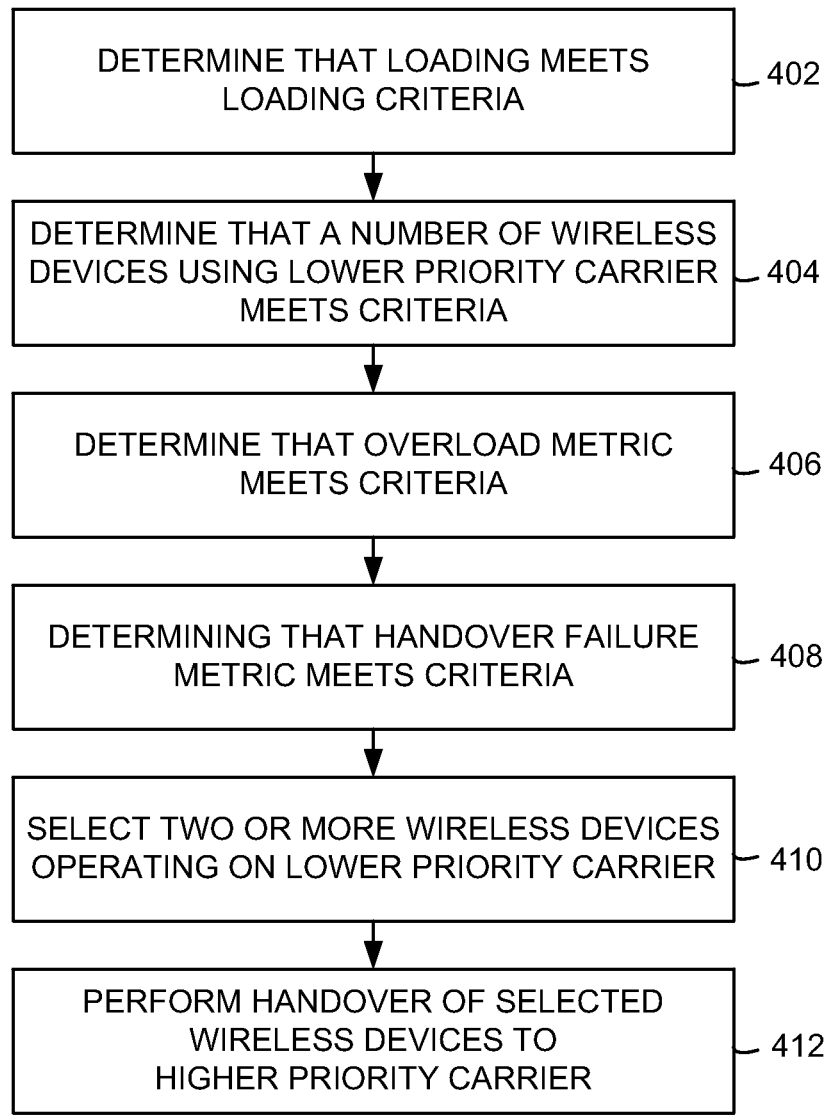
FIG. 4 illustrates another exemplary method of wireless device communication using carrier priority.

FIG. 4 illustrates another exemplary method of wireless device communication using carrier priority. In operation 402, it is determined that a loading of a higher priority carrier meets a loading criteria. For example, wireless device 302 can be in communication with access node 304 over communication link 312. Communication link 312 can correspond to a first carrier associated with a lower priority. Wireless device 302 can also detect communication link 314, which can correspond to a second carrier associated with a higher priority than first carrier 312.

Carrier priorities can be set or determined to encourage use of one carrier preferentially over another carrier. A carrier priority can be determined according to network conditions, communication link conditions, instructions from a network operator, and the like, including combinations thereof. For example, a carrier with greater structure penetration characteristics than another carrier can be associated with a higher priority than the other carrier. Structure penetration characteristics can be based on, for example, a throughput to a wireless device, a modulation and coding scheme available on each carrier, and a location of the wireless device, among others. A carrier with greater structure penetration characteristics can be used for communication with, for example, a higher data rate, or a lower data error rate, than a carrier with relatively lower structure penetration characteristics.

Carrier priority can also be assigned to carriers based on a loading of each carrier, so that less loaded carriers are assigned a higher priority. A loading can be based on a number of wireless devices using a carrier, or on an application requirement of an application running on each wireless device, or on a requested data rate of each wireless device, or on a maximum permitted error rate indicated by each wireless device, or on a maximum permitted delay indicated by each wireless device.

Carrier priority can also be assigned based on wireless communication link conditions. For example, carrier priority can be based on signal interference determined for each carrier, so that higher quality communication links are assigned a higher priority. As another example, carrier priority can be based on determined multipath interference, so that communication links with experiencing lower multipath interference (as determined by a wireless device) can be assigned a higher priority.

In another example, carrier priority can be based on throughput characteristics of each carrier. Throughput characteristics can be based on, among other things, a modulation and coding scheme available to a wireless device on each carrier, a number of bandwidth divisions of each carrier, and a multiple input-multiple output (MIMO) communication type available to the wireless device on each carrier. Examples of a MIMO communication type comprise spatial multiplexing, diversity coding, multi-stream coding, and the like.

It can be determined that a loading of the second carrier meets a loading criteria. For example, access nodes 304 and 306 can periodically receive loading information from each other, such as a load status report or similar information, and from loading information it can be determined that access node 306 supports the second carrier (associated, for example, with communication link 314), and that the second carrier has a higher priority than the first carrier associated with communication link 312. A loading criteria can comprise sufficient network resources to support communications with wireless device 302, based on, for example, available bandwidth of the second carrier, an application requirement of an application running on wireless device 302, a service level requirement associated with wireless device 302, and a backhaul congestion or backhaul utilization of access node 306. A loading criteria can also be based on other factors, as well as combinations of the foregoing.

In operation 404, it is determined that a number of wireless devices using the lower priority carrier meets a usage criteria. For example, access nodes 304 and 306 may comprise counters related to a maximum number of wireless devices each access node can support, which can further comprise a number of wireless devices in a connected state (or actively communicating with an access node) and a number of wireless devices in a low power state (for example, an idle state). In an embodiment, it can be determined that the second carrier has sufficient capacity to accept a handover of a wireless device based on the current number of wireless devices supported by access node 306.

In operation 406, it can be determined that an overload metric meets an overload criteria. For example, an overload metric, such as information indicating a utilization or a loading of the second carrier can be provided by access node 306. The overload metric can indicate, for example, that the second carrier has sufficient resources to support wireless device 302. In an embodiment, the second carrier may have sufficient capacity to support a communication activity of wireless device 302. In an embodiment, a number of other wireless devices operating on the second carrier can be determined, and it can further be determined that adding wireless device 302 to second carrier 314 would not overload second carrier 314. An overload criteria can also include historical information related to carrier loading, such as dropped call information including a number of dropped calls and the conditions under which the dropped calls occurred. A dropped call criteria can be determined, for example, based on minimum conditions in which a call will not be dropped on a carrier. Other loading criteria are also possible.

In operation 408, it can be determined that a handover failure metric meets a handover criteria. For example, it can be determined that the probability that a handover of wireless device 302 to the second carrier is sufficiently likely to be successful. The handover criteria can be based on, for example, a signal strength criteria of the second carrier (for example, the signal strength criteria described above), or, for example, a minimum data rate, a maximum delay, or a maximum error rate determined by wireless device 302. A handover failure criteria can also be based on historical information of each carrier. For example, historical information related to carrier loading can include handover failure information including a number of handover failures and the conditions under which the failures occurred. A handover failure criteria can be determined comprising, for example, based on minimum conditions in which a handover can be successfully performed to a carrier. Other handover criteria are also possible. Use of the handover metric enables an evaluation of the likelihood of a dropped communication session or other result of a handover failure.

In operation 410, two or more wireless devices operating on the lower priority carrier can be selected, and in operation 412 a handover can be performed of the selected wireless devices to the higher priority carrier. In an embodiment, when the loading of the higher priority carrier meets the loading criteria, the number of wireless devices using the lower priority carrier meets the usage criteria, the overload metric meets the overload criteria, and the handover failure metric meets the handover criteria, two or more wireless devices operating on the lower priority carrier can be selected and a handover can be performed of each of the selected wireless devices to the higher priority carrier.

Figure 5:
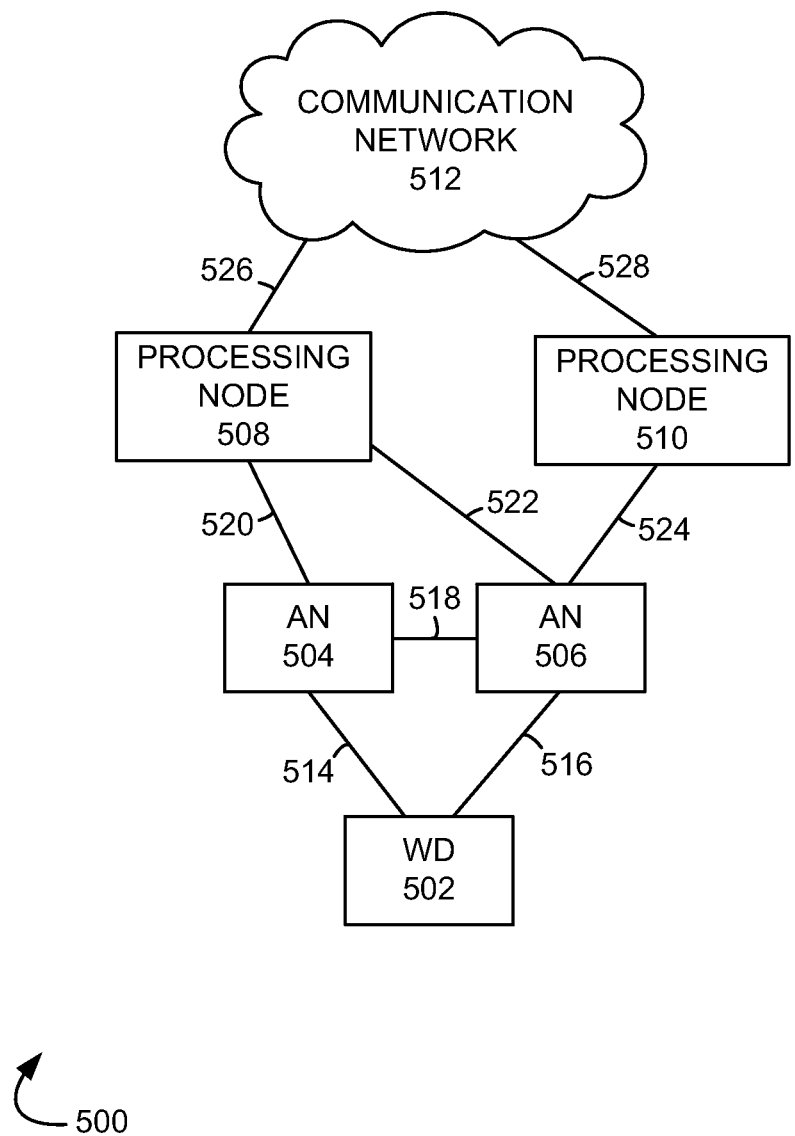
FIG. 5 illustrates another exemplary communication system for wireless device communication using carrier priority.

FIG. 5 illustrates another exemplary communication system for wireless device communication using carrier priority comprising wireless device 502, access nodes 504 and 506, processing nodes 508 and 510, and communication network 512. Examples of wireless device 502 can include a cell phone, a smart phone, a computing platform such as a laptop, palmtop, or tablet, a personal digital assistant, or an internet access device, including combinations thereof. Wireless device 502 can communicate with access node 504 over communication link 514 and with access node 506 over communication link 516. Each of communication links 514 and 516 can comprise a carrier, such as a carrier band or frequency spectrum, such that communication link 514 corresponds with a first carrier and communication link 516 corresponds with a second carrier. While a single wireless device 502 is illustrated in FIG. 5, it will be appreciated that in operation a plurality of wireless devices can be in communication with both access node 504 and access node 506.

Access nodes 504 and 506 are each a network node capable of providing wireless communications to wireless device 502, and can be, for example, a base transceiver station, a radio base station, an eNodeB device, or an enhanced eNodeB device. Access node 504 is in communication with processing node 508 over communication link 520. Access node 506 is in communication processing node 508 over communication link 522, and with processing node 510 over communication link 524. Access nodes 504 and 506 can also communicate with each other over communication link 518. In an embodiment, access node 504 can be under the control of a first network operator, and access node 506 can be under the control of a second network operator.

Processing nodes 508 and 510 are each a network element which can comprise a processor and associated circuitry to execute or direct the execution of computer-readable instructions. Processing nodes 508 and 510 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Processing node 508 can, among other things, direct wireless device communication using carrier priority. Processing nodes 508 and 510 can be for example, a standalone computing device or network element, or the functionality of processing nodes 508 and 510 can be included in another network element. The functionality of processing nodes 508 and 510 can also be incorporated into, or may be distributed across, two or more network elements. Processing node 508 is in communication with communication network 512 over communication link 526, and processing node 510 is in communication with processing node 512 over communication link 528. In an embodiment, processing node 508 can be associated with a first network and processing node 510 can be associated with a second network. In an embodiment, the first network can be under the control of a first network operator, and the second network can be under the control of a second network operator. For example, access node 506, which can communicate with processing nodes 508 and 510, can thus be in communication with a first network and a second network.

Further, the second carrier, associated with communication link 516, can be a carrier which is shared between the first network and the second network, while the first carrier, associated with communication link 514, can be a carrier used only by the first network. A multi-operator core network is an example of a communication system in which a first carrier is used by a first network operator, and a second carrier is shared by the first network operator and a second network operator.

Communication network 512 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 512 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 512 may also include base stations, wireless communication nodes, telephony switches, internet routers, network gateways, computer systems, communication links, or some other type of communication equipment, and combinations thereof.

Communication links 514, 516, 518, 520, 522, 524, 526 and 528 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 500 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 504, access node 506, processing node 508, processing node 510 and communication network 512 which are omitted for clarity, including additional processing nodes, routers, gateways, and physical and/or wireless data links for carrying data among the various network elements.

Figure 6:
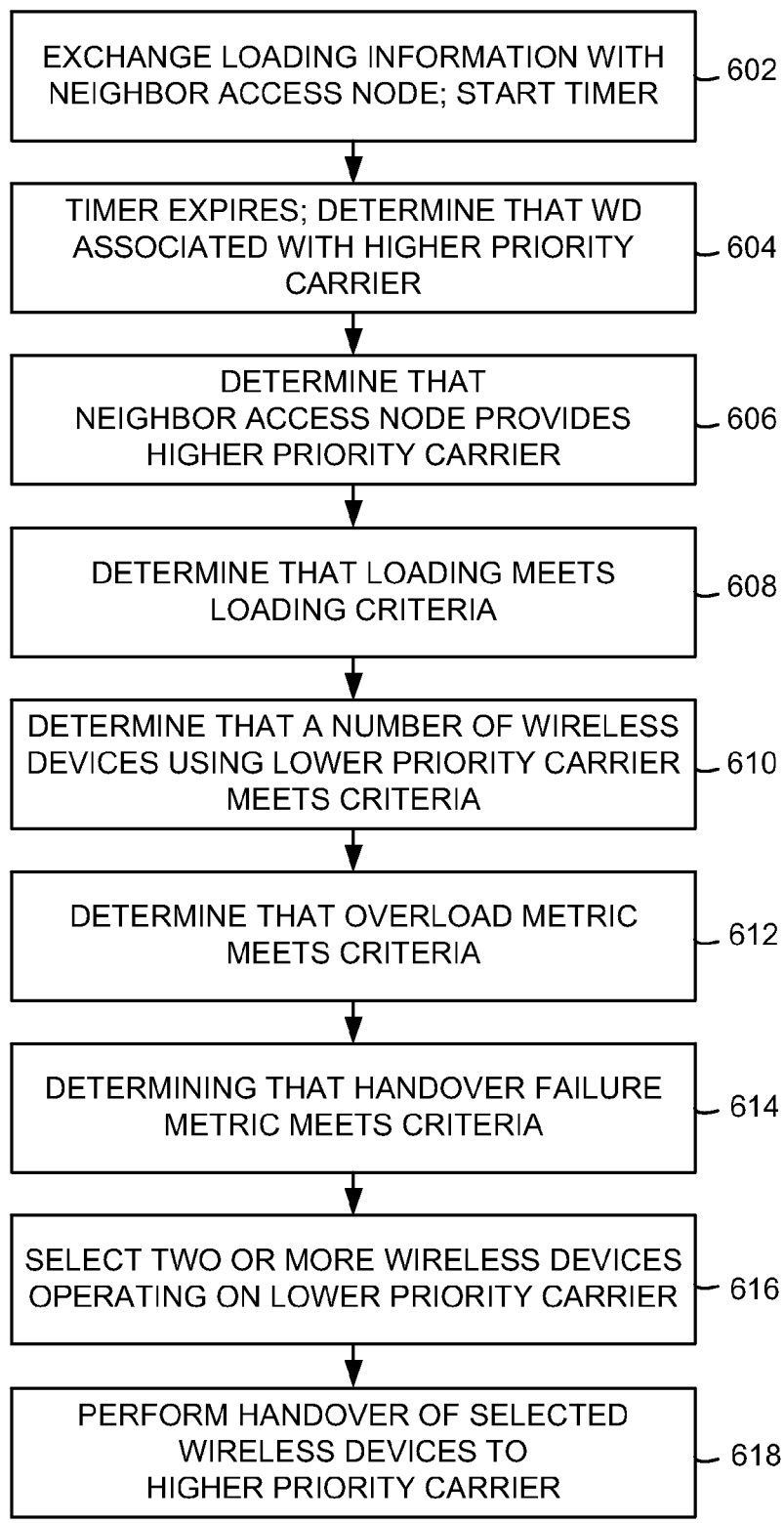
FIG. 6 illustrates another exemplary method of wireless device communication using carrier priority.

FIG. 6 illustrates another exemplary method of wireless device communication using carrier priority. In operation 602, an access node exchanges loading information with a neighbor access node. A neighbor access node can be an second access node with a coverage area substantially adjacent to a coverage area of a first access node. A neighbor access node can also have a coverage area which overlaps in part with the coverage area of the first access node. A neighbor access node can also have a coverage area which is co-extensive with the coverage area of the first access node. A neighbor access node can also have a coverage area which is surrounded by the coverage area of the first access node, or which is substantially within a coverage hole or other gap in the coverage area of the first access node.

In an example, access node 504, in communication with wireless device 502, can send loading information to access node 506, and can also receive loading information from access node 506, over communication link 518. The loading information can comprise, for example, a number of wireless devices in communication with an access node, application requirements of applications running on each of the wireless devices, minimum service requirements of each wireless device, and so forth. In addition, a timer can be started, which can be, for example, in access node 504, or in processing node 508.

In operation 604, when the timer expires, it is determined that a wireless device is associated with a carrier comprising a higher priority than the carrier which the wireless device is presently using. For example, communication link 514 can correspond to a first carrier associated with a lower priority, and communication link 516 can correspond to a second carrier associated with a higher priority than communication link 514. It can be determined that wireless device 502 is associated with the second carrier of communication link 516. The determination can be made, for example, at access node 504, or at processing node 508.

In operation 606, it is determined that the neighbor access node provides the higher priority carrier. For example, based at least in part on the determination that wireless device is associated with higher priority carrier 516, it can be determined that access node 506 provides the higher priority carrier. In an embodiment, the determination can be made at access node 504 based on the loading information received from access node 506. In an embodiment, the determination can be made at processing node 508 based on information received from access nodes 504 and 506.

In operation 608, it is determined that a loading of the higher priority carrier meets a loading criteria. For example, it can be determined from received loading information that access node 506 supports the second carrier, and that the second carrier has a higher priority than the first carrier associated with communication link 514. Carrier priorities can be determined to encourage use of one carrier preferentially over another carrier. A loading criteria can comprise sufficient network resources to support communications with wireless device 502, based on, for example, available bandwidth of the second carrier, an application requirement of an application running on wireless device 502, a service level requirement associated with wireless device 502, and a backhaul congestion or backhaul utilization of access node 506. A loading criteria can also be based on other factors, as well as combinations of the foregoing.

In operation 610, it is determined that a number of wireless devices using the lower priority carrier meets a usage criteria. For example, access nodes 504 and 506 may comprise counters related to a maximum number of wireless devices each access node can support, which can further comprise a number of wireless devices in a connected state (or actively communicating with an access node) and a number of wireless devices in a low power state (for example, an idle state). In an embodiment, it can be determined that the second carrier has sufficient capacity to accept a handover of a wireless device based on the current number of wireless devices supported by access node 506.

In operation 612, it can be determined that an overload metric meets an overload criteria. For example, an overload metric, such as information indicating a utilization or a loading of the second carrier can be provided by access node 506. The overload metric can indicate, for example, that the second carrier has sufficient resources to support wireless device 502. In an embodiment, the second carrier may have sufficient capacity to support a communication activity of wireless device 502. In an embodiment, a number of other wireless devices operating on the second carrier can be determined, and it can further be determined that adding wireless device 502 to second carrier 516 would not overload second carrier 516. An overload criteria can also include historical information related to carrier loading, such as dropped call information including a number of dropped calls and the conditions under which the dropped calls occurred. A dropped call criteria can be determined, for example, based on minimum conditions in which a call will not be dropped on a carrier. Other loading criteria are also possible.

In operation 614, it can be determined that a handover failure metric meets a handover criteria. For example, it can be determined that the probability that a handover of wireless device 502 to the second carrier is sufficiently likely to be successful. The handover criteria can be based on, for example, a signal strength criteria of the second carrier (for example, the signal strength criteria described above), or, for example, a minimum data rate, a maximum delay, or a maximum error rate determined by wireless device 502. A handover failure criteria can also be based on historical information of each carrier. For example, historical information related to carrier loading can include handover failure information including a number of handover failures and the conditions under which the failures occurred. A handover failure criteria can be determined comprising, for example, based on minimum conditions in which a handover can be successfully performed to a carrier. Other handover criteria are also possible. Use of the handover metric enables an evaluation of the likelihood of a dropped communication session or other result of a handover failure.

In operation 616, two or more wireless devices operating on the lower priority carrier can be selected, and in operation 618 a handover can be performed of the selected wireless devices to the higher priority carrier. In an embodiment, when the loading of the higher priority carrier meets the loading criteria, the number of wireless devices using the lower priority carrier meets the usage criteria, the overload metric meets the overload criteria, and the handover failure metric meets the handover criteria, two or more wireless devices operating on the lower priority carrier can be selected and a handover can be performed of each of the selected wireless devices to the higher priority carrier.

Figure 7:
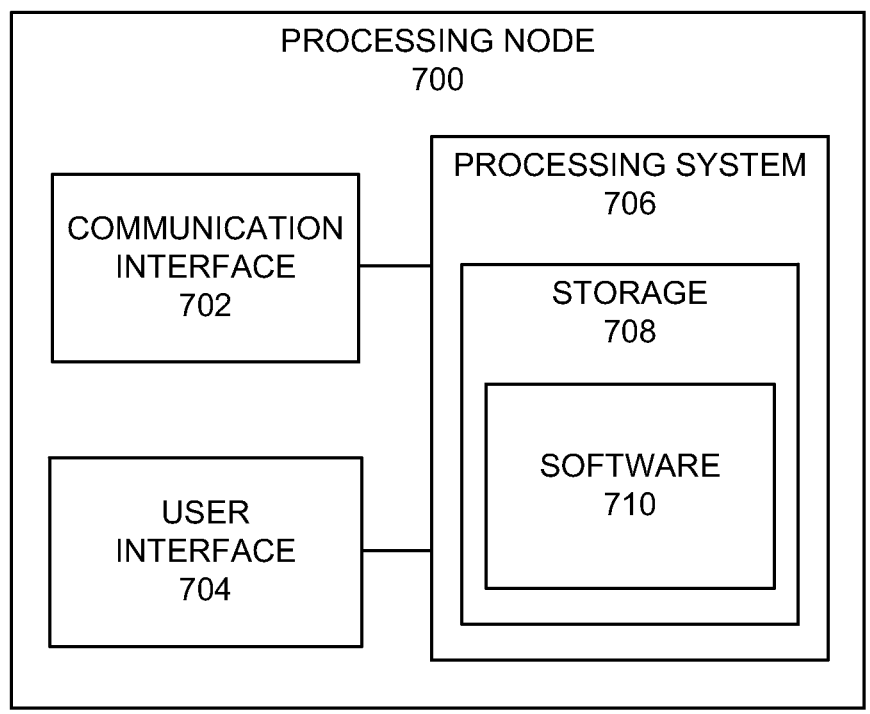
FIG. 7 illustrates an exemplary processing node.

FIG. 7 illustrates an exemplary processing node 700 in a communication system. Processing node 700 comprises communication interface 702, user interface 704, and processing system 706 in communication with communication interface 702 and user interface 704. Processing node 700 is capable of directing wireless device communication using carrier priority. Processing system 706 includes storage 708, which can comprise a disk drive, flash drive, memory circuitry, or other memory device. Storage 708 can store software 710 which is used in the operation of the processing node 700. Storage 708 may include a disk drive, flash drive, data storage circuitry, or some other memory apparatus. Software 710 may include computer programs, firmware, or some other form of machine-readable instructions, including an operating system, utilities, drivers, network interfaces, applications, or some other type of software. Processing system 706 may include a microprocessor and other circuitry to retrieve and execute software 710 from storage 708. Processing node 700 may further include other components such as a power management unit, a control interface unit, etc., which are omitted for clarity. Communication interface 702 permits processing node 700 to communicate with other network elements. User interface 704 permits the configuration and control of the operation of processing node 700.

An example of processing node 700 includes processing node 308. Processing node 700 can also be another network element, or an adjunct or component of a network element, in communication network 106 or communication network 310. The functionality of processing node 700 can also be distributed on two or more network elements.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of wireless device communication, comprising:
exchanging loading information between a first access node controlled by a first network operator and a neighboring access node controlled by a second network operator, the loading information being associated with a plurality of wireless devices communicating with the first access node using a first spectrum carrier and the neighboring access node using a second spectrum carrier;
starting a timer at the first access node for a period of time;
after the timer expires, determining that a maximum permitted delay of one or more wireless devices communicating with the first access node using the first spectrum carrier meets a priority associated with the second spectrum carrier of the neighboring access node, wherein the second spectrum carrier has a higher priority than the first spectrum carrier and comprises greater structure penetration characteristics than the first spectrum carrier, wherein the structure penetration characteristics of the first spectrum carrier and the second spectrum carrier are based on a throughput to the one or more wireless devices, an available modulation and coding scheme (MCS), and a location of the one or more wireless devices;
determining, at the first access node, that a loading of the second spectrum carrier meets an overload criteria, the overload criteria being based on a capacity of the second spectrum carrier to support the one or more wireless devices communicating with the first access node using the first spectrum carrier and historical loading information of the second spectrum carrier; and
performing a handover of the one or more wireless devices communicating with the first access node using the first spectrum carrier from the first spectrum carrier to the second spectrum carrier of the neighboring access node when a signal strength of the second spectrum carrier meets a signal strength criteria.

2. The method of claim 1, wherein the first spectrum carrier comprises a first frequency associated with the first network operator and the second spectrum carrier comprises a second frequency associated with the second network operator.

3. The method of claim 1, wherein the second spectrum carrier comprises a lower multipath interference than the first spectrum carrier.

4. The method of claim 1, wherein the second spectrum carrier comprises greater throughput characteristics than the first spectrum carrier, wherein the throughput characteristics of the first spectrum carrier and the second spectrum carrier are based on at least one of the available MCS, a number of bandwidth divisions, and a multiple input-multiple output (MIMO) communication type.

5. The method of claim 1, wherein determining that the loading of the second spectrum carrier meets the overload criteria further comprises determining that a handover failure metric does not meet a handover failure criteria.

6. The method of claim 1, wherein determining that the loading of the second spectrum carrier meets the overload criteria further comprises determining that a dropped call metric does not meet a dropped call criteria.

7. A system for wireless device communication, comprising:
a processing node configured to:
exchange loading information between a first access node controlled by a first network operator and a neighboring access node controlled by a second network operator, wherein the loading information is associated with a plurality of wireless devices communicating with the first access node using a first spectrum carrier and the neighboring access node using a second spectrum carrier;
start a timer at the first access node for a period of time;
after the timer expires, determine a maximum permitted delay of one or more wireless devices communicating with the first access node using the first spectrum carrier meets a priority associated with the second spectrum carrier of the neighboring access node, wherein the second spectrum carrier has a higher priority than the first spectrum carrier and comprises greater structure penetration characteristics than the first spectrum carrier, wherein the structure penetration characteristics of the first spectrum carrier and the second spectrum carrier are based on a throughput to the one or more wireless devices, an available modulation and coding scheme (MCS), and a location of the one or more wireless devices;
determine that a loading of the second spectrum carrier meets an overload criteria, the overload criteria being based on a capacity of the second spectrum carrier to support the one or more wireless devices communicating with the first access node using the first spectrum carrier and historical loading information of the second spectrum carrier; and
perform a handover of the one or more wireless device communicating with the first access node using the first spectrum carrier from the first spectrum carrier to the second spectrum carrier of the neighboring access node when a signal strength of the second spectrum carrier meets a signal strength criteria.

8. The system of claim 7, wherein the first spectrum carrier comprises a first frequency associated with the first network operator and the second spectrum carrier comprises a second frequency associated with the second network operator.

9. The system of claim 7, wherein the second spectrum carrier comprises a lower multipath interference than the first spectrum carrier.

10. The system of claim 7, wherein the second spectrum carrier comprises greater throughput characteristics than the first spectrum carrier, wherein the throughput characteristics of the first spectrum carrier and the second spectrum carrier are based on at least one of the available MCS, a number of bandwidth divisions, and a multiple input-multiple output (MIMO) communication type.

11. The system of claim 7, wherein determining that the loading of the second spectrum carrier meets the overload criteria further comprises determining that a handover failure metric does not meet a handover failure criteria.

12. The system of claim 7, wherein determining that the loading of the second spectrum carrier meets the overload criteria further comprises determining that a dropped call metric does not meet a dropped call criteria.

* * * * *